United States Patent
Guillemin (10) Patent No.: US 9,577,427 B2
(45) Date of Patent: Feb. 21, 2017

(54) LOAD-BALANCING DEVICE ON A POLYPHASE NETWORK

(75) Inventor: Sylvain Guillemin, Allevard les Bains (FR)

(73) Assignee: Commissariat à l'énergie Atomique et aux énergies alternatives, Paris (FR)

(*) Notice: Subject to any disclaimer, the term of this patent is extended or adjusted under 35 U.S.C. 154(b) by 849 days.

(21) Appl. No.: 13/985,944

(22) PCT Filed: Feb. 14, 2012

(86) PCT No.: PCT/EP2012/052444
§ 371 (c)(1),
(2), (4) Date: Sep. 10, 2013

(87) PCT Pub. No.: WO2012/110472
PCT Pub. Date: Aug. 23, 2012

(65) Prior Publication Data
US 2014/0001850 A1    Jan. 2, 2014

(30) Foreign Application Priority Data
Feb. 18, 2011 (FR) ..................... 11 51364

(51) Int. Cl.
*H02J 3/14* (2006.01)
*H02J 3/00* (2006.01)
*H02J 3/26* (2006.01)

(52) U.S. Cl.
CPC .. *H02J 3/00* (2013.01); *H02J 3/26* (2013.01); *H02J 3/14* (2013.01); *Y02E 40/50* (2013.01); *Y10T 307/406* (2015.04)

(58) Field of Classification Search
CPC ............. H02J 3/26; H02J 3/14; H02J 3/00; Y02E 40/50; H02H 3/34; Y10T 307/406
See application file for complete search history.

(56) References Cited

U.S. PATENT DOCUMENTS 4,177,508 A * 12/1979 Schmid ............... H02J 3/26
363/37
5,181,180 A * 1/1993 Munro ................. H02J 3/26
307/39

(Continued)

FOREIGN PATENT DOCUMENTS

DE      102008027887       9/2009
IL     WO 2004084389 A2 *  9/2004  ............. H02J 3/005

(Continued)

*Primary Examiner* — Rexford Barnie
*Assistant Examiner* — Rasem Mourad
(74) *Attorney, Agent, or Firm* — Occhiuti & Rohlicek LLP (57) ABSTRACT

A load-balancing device includes a control module, and a converter for generating a voltage supplying a single-phase electrical load connected to a polyphase electrical network. The converter selectively modifies a phase shift between its output and phases of the polyphase electrical network. The control module controls synchronization of the output with a first phase of the network and its progressive phase shifting when it is synchronized with a second phase of the polyphase electrical network. It also controls connection of the load to the network and to the converter when the converter and first phase are synchronized. The control module maintains disconnection of the load from the network during the progressive phase shifting of the converter output voltage, and controls its connection the second phase of the network when its output is synchronized with the second phase.

12 Claims, 5 Drawing Sheets

(56) References Cited

U.S. PATENT DOCUMENTS

| | | | |
|---|---|---|---|
| 5,281,859 A | | 1/1994 | Crane |
| 6,018,203 A | * | 1/2000 | David .................. H02J 3/14 |
| | | | 307/18 |
| 8,009,450 B2 | * | 8/2011 | Royak ................. H02M 7/219 |
| | | | 363/84 |
| 9,270,117 B2 | * | 2/2016 | Umland ................ H02J 3/26 |
| 2004/0196604 A1 | * | 10/2004 | Matsumoto ............. H02J 3/26 |
| | | | 361/62 |
| 2011/0278931 A1 | * | 11/2011 | Johnson, Jr. ........... H02J 3/26 |
| | | | 307/66 |

FOREIGN PATENT DOCUMENTS

| | | |
|---|---|---|
| JP | H7-31058 | 1/1995 |
| JP | H11-89092 | 3/1999 |
| JP | 2006-521079 | 9/2006 |
| WO | WO98/26489 | 6/1998 |
| WO | 2004/084389 | 9/2004 |
| WO | 2010/126652 | 11/2010 |

* cited by examiner

LOAD-BALANCING DEVICE ON A POLYPHASE NETWORK

CROSS REFERENCE TO RELATED APPLICATION

This application is the national phase under 35 U.S.C. 371 of international application no. PCT/EP2012/052444, filed Feb. 14, 2012, which claims the benefit of the priority date of French application no. 1151364, filed Feb. 18, 2011. The contents of the aforementioned applications are incorporated herein in their entirety.

FIELD OF DISCROSURE

The invention relates to polyphase electrical networks, and in particular to the balancing of polyphase networks supplying a multitude of single-phase loads.

BACKGROUND

Document WO98/26489 describes an apparatus for evenly apportioning the electrical loads on a polyphase power distribution network. Current probes perform a measurement of current for each incoming phase and in each branch of the supplied network. A processor analyses the measurements of the current probes. Each branch comprises a multipole switch and an isolator. The processor is connected to each breaker so as to selectively connect each branch to a single appropriate phase after having interrupted its power supply by means of its isolator. Thus, the electrical loads are apportioned by the processor over the various phases.

In electrical networks, the transport of electricity is generally performed by three-phase networks up to the distribution site. For reasons of structural simplicity and voltage level, most loads connected to the electrical network are single-phase loads. A single-phase load is connected between a phase and the neutral of the three-phase network. A large number of single-phase loads is generally connected to the three-phase network. On account of the power differences of the loads connected to these three phases, the three-phase network experiences imbalances between the phases. The currents drawn by the various phases are then different, and this may lead to voltage drops, energy losses, limitation of the number of connectable loads, degradation of the quality of the current, and/or overload of the electricity generator. When a photovoltaic installation supplies the three-phase network, it may even turn out to be necessary to inject current from an external network based on other energy sources in order to balance the currents on the various phases.

When the utility operating the three-phase electrical network notes recurring phase imbalances, it undertakes rebalancings. Within the framework of electrical networks, the loads are usually single-phase transformers which provide energy to a small group of dwellings. When a recurring phase imbalance is noted, a new distribution of the loads is designed. A technician then intervenes directly on one or more transformers to connect them to other phases.

To avoid having to design the new distribution of the loads empirically, the document entitled "phase swapping for distribution system using tabu search" proposes an algorithm for optimizing the distribution of these loads.

Even when optimizing the distribution of the loads on the three-phase network, manual technical intervention remains necessary, thereby greatly limiting the frequency of the achievable modifications of distribution. Such intervention furthermore requires a shutdown of one or more loads, thereby limiting the possible frequency at which it can be carried out. A shutdown of a load may also turn out to be incompatible with its operation, certain loads having to remain in continuous service, for example computer servers or medical equipment. Such a redefinition of the load distributions is therefore performed only when truly necessary, to the detriment of the balance between the phases over long periods.

SUMMARY

The invention is aimed at solving one or more of these drawbacks. The invention thus pertains to a device for phase balancing on a polyphase electrical network, comprising:
  a converter generating an output voltage intended to supply a single-phase electrical load connected to the polyphase electrical network, the converter being configured to selectively modify the phase shift between its output voltage and the phases of the polyphase electrical network;
  a module for controlling the synchronization of the converter, able to:
  control the synchronization of the output voltage of the converter with a first phase of the electrical network;
  control a progressive phase shifting of the output voltage of the converter until it is synchronized with a second phase of the electrical network;
  a module for controlling connection of the single-phase electrical load to the electrical network, controlling the connection of the electrical load to the converter voltage when the latter is synchronized with the first phase of the network, maintaining the electrical load disconnected from the network during the progressive phase shifting of the output voltage, controlling the connection of the electrical load to the second phase of the electrical network when the converter output voltage is synchronized with the second phase of the electrical network.

According to a variant, the device comprises:
  an interface for recovering the consumptions of various single-phase loads connected to the polyphase electrical network to be balanced;
  a calculation module able to;
  determine an imbalance between phases on the polyphase electrical network;
  identify a single-phase load for which a transfer to another phase would make it possible to improve the imbalance between phases;
  transmit a request for transfer to another phase for said identified load to the module for controlling the synchronization of the converter.

According to a further variant, the calculation module is able to:
  identify several single-phase loads for which a transfer to other phases would make it possible to improve the imbalance between phases;
  transmit successive requests for transfer to other phases for said identified loads to the module for controlling the synchronization of the converter.

According to another variant, said converter includes an inverter.

According to yet another variant, said converter comprises an AC/DC converter exhibiting an interface for power supply by the polyphase network and whose output supplies the inverter.

According to a variant, the module for controlling the synchronization of the inverter controls the progressive phase shifting of the output voltage of the inverter by modifying the frequency of the output voltage of the inverter.

According to a further variant, said converter includes:
an electric motor with variable speed drive supplied by the polyphase network;
a synchronous generator driven by the electric motor and generating the output voltage.

The invention also pertains to a system for phase balancing on a polyphase electrical network, comprising:
a balancing device such as described hereinabove;
a device for interconnecting an electrical load to the electrical network, comprising:
an interface for connecting the phases of the polyphase electrical network;
an interface for connecting the electrical load;
an interface for connecting a power supply line on which the output voltage of the converter is applied;
a switching device in communication with the module for controlling synchronization of the converter and selectively connecting the interface for connecting the electrical load to a phase of the electrical network and/or to the power supply line as a function of control signals received from the control module.

According to a variant, the interconnection device comprises a device for measuring the electrical consumption of an electrical load connected to the interface for connecting the load, said measurement device being in communication with the balancing device.

The invention furthermore pertains to a polyphase electrical network, comprising:
transport lines for respective phases of the network;
a transport line for a load transfer power supply;
a photovoltaic generator supplying the phases transport lines;
a balancing system such as described hereinabove, connected to the phases transport lines and to the transport line for the load transfer power supply.

The invention moreover pertains to a method of load balancing on a polyphase electrical network, comprising the steps of:
synchronization of the output voltage of an inverter with a first phase of the electrical network supplying a single-phase load;
application of the output voltage of the inverter on a transfer line;
connection of the load to the transfer line and disconnection of the load from the first phase;
progressive phase shifting of the output voltage of the inverter until it is synchronized with the second phase;
connection of the load to the second phase.

According to a variant, the synchronization step is preceded by the steps of:
recovery of the electrical consumptions of the various loads connected to the electrical network;
determination of an imbalance between phases on the network;
identification of a load for which a change of phase would make it possible to improve the imbalance between phases on the basis of the electrical consumptions recovered.

BRIEF DESCRIPTION OF THE FIGURES

Other characteristics and advantages of the invention will emerge clearly from the description given thereof hereinafter, by way of wholly nonlimiting indication, with reference to the appended drawings, in which.

DETAILED DESCRIPTION

The invention proposes a device for balancing phases for single-phase loads connected to a polyphase electrical network. A converter is configured to selectively modify the phase shift between its output voltage and the phases of the polyphase electrical network. The device synchronizes the output voltage of the converter with a first phase to which a single-phase load is connected. The device controls the connection of the output of the converter with the electrical load. The control device keeps the load disconnected from the first phase during a progressive phase shifting of the output voltage of the converter until a second phase. The device controls the connection of the load with the second phase.

Thus, it is possible to balance the phases on the network at regular intervals, without manual intervention and while guaranteeing a continuity of service to the loads connected to the network. The three-phase electrical network thus enjoys permanently optimized phase balancing, thereby making it possible to solve the problematic issue of phase imbalance in a large number of applications.

Figure 1:
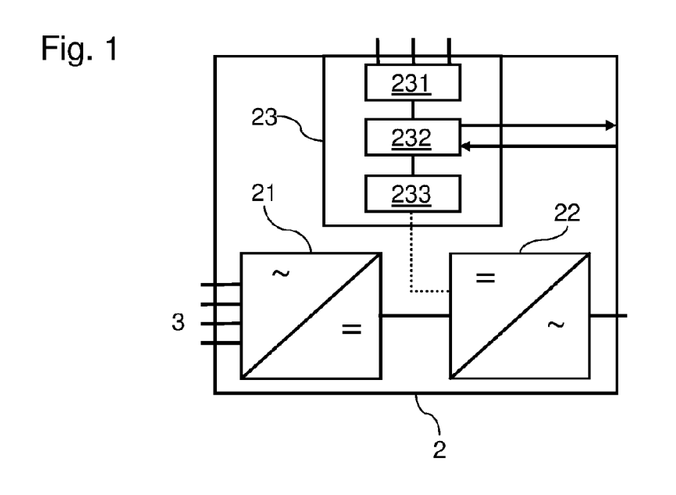
FIG. 1 is a schematic representation of a device for balancing phases according to one embodiment of the invention.

FIG. 1 is a schematic representation of an embodiment of a device for balancing phases 2 according to a first embodiment of the invention. The balancing device 2 exhibits a connection interface with a three-phase network 3. In this embodiment, the transfer of a load between two phases is carried out by way of an inverter, the phase shift of whose output voltage can be modified with respect to the phases of the three-phase network 3. The balancing device 2 advantageously comprises an AC/DC converter (three-phase rectifier) 21 receiving the phases ph1, ph2, ph3 and the neutral N of the network 3. The output of the converter 21 is connected to an input of the inverter 22. The output of the inverter 22 is intended to be connected to interconnection boxes in order to transiently supply a single-phase electrical load, usually connected to a phase of the network 3.

The balancing device 2 furthermore comprises a control module 23 for the inverter, implemented for example in microcontroller form. The control module 23 exhibits a connection interface with the three-phase network 3. A measurement module 231 for the control module 23 can thus determine the peak voltage, the electrical consumption on each of the phases ph1, ph2, ph3, and the phasing of each of the phases ph1, ph2, ph3 of the network 3. The device 2 furthermore exhibits an interface for connecting the control module 23 with a communication network connected to the interconnection box. The control module 23 exhibits a processing circuit 232 connected to this interface so as to emit connection/disconnection commands destined for the interconnection boxes, and receive measurements of electrical consumption originating from these interconnection boxes. The processing circuit 232 can also receive the status of the electrical interconnection in each of the interconnection boxes. The control module 23 furthermore exhibits a control circuit 233 connected to an input of the inverter 22. The control circuit 233 can for example define the phasing and/or the amplitude of the output voltage delivered by the inverter 22.

Figure 2:
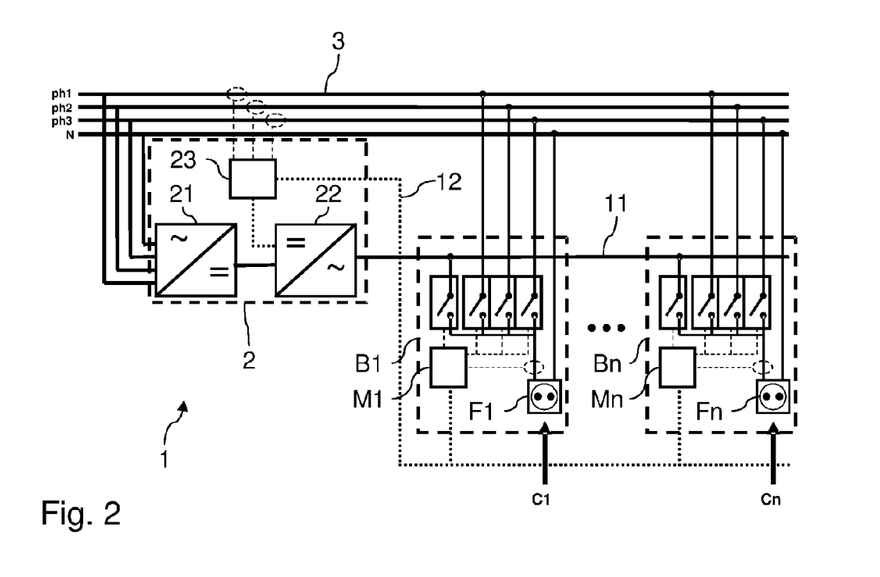
FIG. 2 is a schematic representation of an electrical network implementing the balancing device of FIG. 1.

FIG. 2 illustrates an exemplary electrical network 3 in which the balancing device 2 is connected. The device 2 is connected to the network 3 by its connection interfaces. The device 2 is moreover connected to a loads transfer line 11 and to a communication line 12. Interconnection boxes B1 to Bn are connected to the network 3 for their connection to one of the phases ph1, ph2 or ph3. The interconnection boxes B1 to Bn are also connected to the loads transfer line 11. The interconnection boxes B1 to Bn comprise respective microcontrollers M1 to Mn. The interconnection boxes B1 to Bn moreover comprise connection receptacles F1 to Fn for respective electrical loads C1 to Cn. The microcontrollers are connected to the control module 23 by way of the communication line 12. The person skilled in the art will be able to choose any appropriate communication line 12, favoring for example robustness and security of transmission between the device 2 and the interconnection boxes B1 to Bn. Each microcontroller M1 to Mn measures the electrical consumption of the load connected to its box. Relays selectively connect the receptacle of the box to one of the phases of the network 3 and/or to the transfer line 11. Each receptacle F1 to Fn of a box is moreover connected to the neutral of the network 3.

Although not illustrated, each load interconnection device exhibits a failure monitoring circuit able to open the breakers Is, I1, I2 and I3 upon the detection of a malfunction or an emergency shutdown.

In practice, the circuit 232 identifies an imbalance of phases on the basis of the measurements of electrical consumption on the network 3. On the basis of the electrical consumption measurements provided by the interconnection boxes B1 to Bn and as a function of the interconnection statuses of these various boxes, the circuit 232 determines an optimal configuration of the interconnection of the boxes, intended to re-balance the load on the various phases of the network 3. The circuit 232 then commands the transfer of a load from one phase of the network to another. The reconfiguration of the interconnection of the boxes will be able to induce the successive transfers of several loads from one phase to another. The control circuit 232 will be able to define the load transfers to be performed by making for example a compromise between optimal balancing of the loads between the phases and a reduced number of load transfers.

Figure 3:
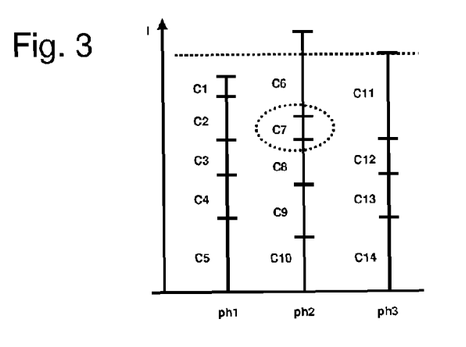
FIG. 3 is a chart illustrating the currents on several phases before a rebalancing.

FIG. 3 is a chart illustrating the amplitude of currents on the various phases of the network before a rebalancing. As illustrated, the current on each phase is the sum of the currents drawn by the loads which are connected to it. The loads C1 to C5 are connected to the phase ph1, the loads C6 to C10 are connected to the phase ph2, the loads C11 to C14 are connected to the phase ph3. In the example illustrated, the circuit 232 identifies an imbalance of phases. The current on the phase ph2 is thus greater than the current on the phase ph3, and the current on the phase ph1 is less than the current on the phase ph3. On the basis of the amplitude of the imbalance, the circuit 232 determines whether the transfer of one or more loads between the phases makes it possible to improve the balance. The circuit 232 takes into account in particular the status of connection of the loads to the various phases and the amplitude of the currents drawn by each of these loads. The circuit 232 thus determines that the transfer of the load C7 from the phase ph2 to the phase ph1 makes it possible to re-balance the phases of the network 3 in an optimal manner.

FIGS. 4a to 4e illustrate the configuration of the relays Is, I1, I2 and I3 of the box B7 during the transfer of the load C7 from the phase ph2 to the phase ph1.

Figure 4A:
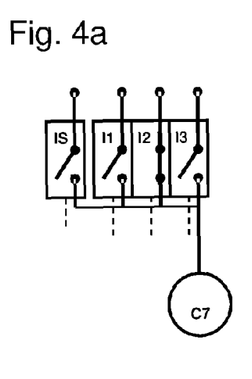
FIGS. 4a to 4e illustrate various configurations of switches during a rebalancing.

In FIG. 4a, the processing circuit 232 keeps the relay I2 closed and keeps the relays Is, I1 and I3 open. The control circuit 233 moreover controls the synchronization of the output of the inverter 22 with the phase ph2.

Figure 4B:
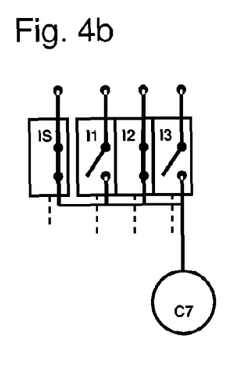

In FIG. 4b, the output of the inverter 22 is synchronized with the phase ph2 and exhibits one and the same amplitude. The load C7 can thus be connected simultaneously to the phase ph2 and to the transfer line 11. Thus, the processing circuit 232 closes the relay Is, keeps the relay I2 closed and keeps the relays I1 and I3 open.

Figure 4C:
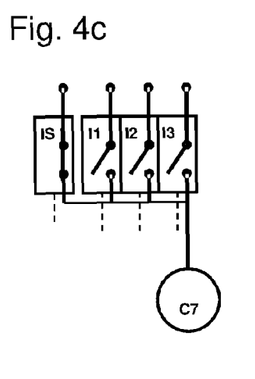

In FIG. 4c, the load C7 is disconnected from the phase ph2 to ensure its transfer to the phase ph1. The processing circuit 232 opens the relay I2, keeps the relay Is closed and keeps the relays I1 and I3 open. The control circuit 233 controls a progressive phase shifting of the output voltage of the inverter 22 until it is synchronized with the phase ph1. A power supply voltage is therefore maintained on the line 11, thereby making it possible to ensure continuous service for the load C7 even during its transfer. The output voltage of the inverter 22 is then in phase with the phase ph1 and exhibits one and the same amplitude.

Figure 4D:
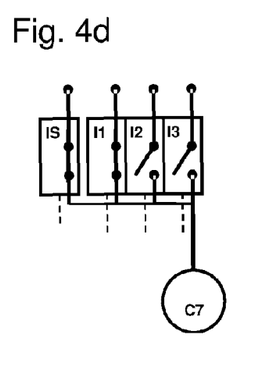

In FIG. 4d, the load C7 is connected to the phase ph1 and remains connected to the transfer line 11. The processing circuit 232 closes the relay I1, keeps the relay Is closed and keeps the relays I2 and I3 open.

Figure 4E:
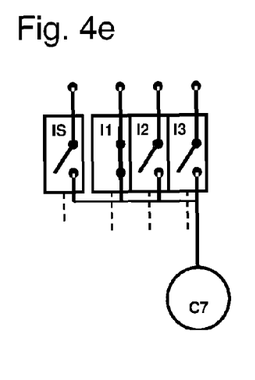

In FIG. 4e, the load C7 remains connected solely to the phase ph1, the transfer to this phase is thus carried out. The processing circuit 232 opens the relay Is, keeps the relay I1 closed and keeps the relays I2 and I3 open. The load C7 is then supplied solely by the phase ph1.

Once the transfer of a load has been performed, the transfer of another load can be carried out, as a function of the change of interconnection configuration, determined by the processing circuit 232.

Thus, the inverter 22 supplies a load only for the duration of its transfer to another phase. Thus, the powering of a load by the inverter 22 is merely transient and the transformation losses induced in the device 2 have only a transient impact on the electrical consumption of the network 3.

The rating of the transfer line 11 and of the inverter 22 can be relatively reduced. This rating is in fact defined by the load potentially exhibiting the largest current inrush, and not by the set of loads.

In this example, the disconnection between the load and the phase ph2 is posterior to the closing of the relay Is for the sake of intelligibility. However, the disconnection between the load and the phase ph2 can be performed almost simultaneously with the closing of the relay Is, in particular when static relays are used. The opening of the relay I2 can thus be carried out as soon as the inverter is synchronized with the phase ph2.

In this example, the disconnection between the load and the inverter is posterior to the closing of the relay I1 for the sake of intelligibility. However, the disconnection between the load and the inverter can be performed almost simultaneously with the closing of the relay I1, in particular when static relays are used. The opening of the relay Is can thus be carried out as soon as the inverter is synchronized with the phase ph1.

The relays I1, I2 and I3 are kept open during the synchronization of the inverter with the desired phase.

The progressive phase shift on the output voltage of the inverter 22 can be carried out by decreasing or by increasing the frequency of its output voltage slightly, until it is in phase with the target phase. For an electrical network supplied at 50 Hz, it will be possible for the frequency of the output voltage to be lowered to 49.5 Hz or increased to 50.5 Hz. Such frequency variations are entirely feasible for most electrical loads, most public electrical networks requiring a tolerance of 1% of frequency variation with respect to the nominal frequency. Continuous service of the loads without operational disturbance can thus be obtained. Such frequency variations also make it possible to synchronize the output voltage of the inverter 22 with another phase in a relatively reduced time. Thus, a modification of interconnection configuration of the loads can be carried out in a reduced time. The modifications of interconnection configuration can thus be carried out at reduced intervals, thereby favoring optimal operation of the network 3 most of the time. The in-line losses are thus limited to the best possible extent, the time required to design the load interconnections (temporal distributions, geographical distributions, etc.) is reduced, the balancing current inrushes for polyphase networks supplied by photovoltaic panels is limited to the maximum, manual interventions and rebalancing outages are eliminated, the autoconsumption of a possible nearby photovoltaic electricity production infrastructure is maximized.

Provision may be made for reduced intervals for analyzing the phase imbalance to be defined before envisaging a reconfiguration of the interconnections of the loads. The balancing of the phases will be able for example to be measured at an interval of about ten minutes or at an interval of one or more hours.

FIGS. 5a to 5e illustrate the evolution of the output voltage of the inverter 22 during the previously detailed transfer of the phase ph2 to the phase ph1. The progressive phase shifting of the output voltage of the inverter 22 illustrated in these figures is induced by decreasing its frequency.

Figure 5A:
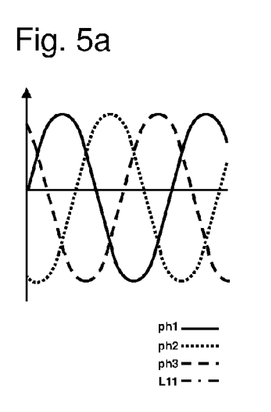
FIGS. 5a to 5e illustrate the evolution of the voltage provided by the balancing device during a rebalancing.
Figure 5B:
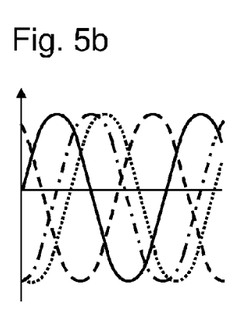
Figure 5C:
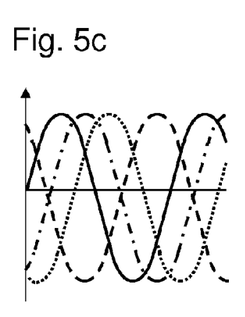
Figure 5D:
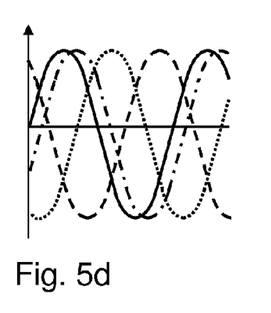
Figure 5E:
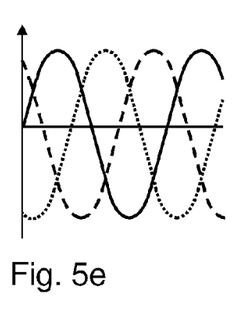

In FIG. 5a, the voltage on the transfer line 11 is synchronized with the phase ph2. In FIGS. 5b to 5d, the load C7 is supplied solely by the transfer line 11, the voltage on this transfer line being progressively phase-shifted with respect to the phase ph2, the inverter 22 generating an output voltage with a lower frequency than that of the network 3. In FIG. 5e, the voltage of the transfer line 11 is synchronized with the phase ph1 and its frequency is again identical to that of the network 3. The load C7 can then be decoupled from the transfer line 11 so as to be supplied solely by the phase ph1.

Figure 6:
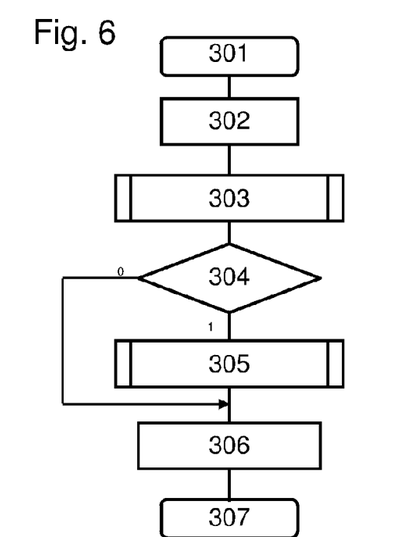
FIG. 6 illustrates a logic diagram of the operation of the balancing device.

FIG. 6 illustrates a logic diagram of the operation of the processing circuit 232. During a step 301, the processing circuit 232 is activated, for example by a wakeup of the control module 23. As detailed earlier, the activation of the processing circuit 232 can occur at regular intervals, for example of the order of 5 to 10 minutes. During a step 302, the processing circuit 232 recovers the currents consumed by the loads as well as the currents on the various phases of the network 3. The current measurements recovered or performed by the processing circuit 232 will advantageously extend over one or more tens of seconds, so as to work on averages of electrical consumption with a view to optimizing the balance of the network 3. The processing circuit 232 is also aware of the interconnection status of the boxes B1 to Bn. During step 303, the processing circuit 232 searches for the best configuration for interconnecting the loads to the phases of the network 3. The processing circuit 232 then generates a list of the load transfers between phases to be performed. The list takes for example the form of commands having the following form: Cp (B$_i$, ph$_j$, ph$_k$), B$_i$ corresponding to the interconnection box concerned in the load transfer, ph$_j$ corresponding to the phase currently applied to the corresponding load, ph$_k$ corresponding to the phase to which the transfer is to be performed.

During step 304, the processing circuit 232 verifies whether load transfers remain to be performed. If no load transfer has to be performed, the process passes to step 306. If at least one load transfer remains to be performed, the process passes to step 305. In step 305, the processing circuit 232 dispatches to the control circuit 233 a load transfer command Cp(B$_i$, ph$_j$, ph$_k$) present in the list of load transfers to be performed. At the end of step 305, the processing circuit 232 removes this last load transfer command from the list of load transfers to be performed.

During step 306, it is determined that a load transfer is not necessary or that all the load transfers have been carried out. The control module 23 then passes to standby. In step 307, the balancing process terminates.

Figure 7:
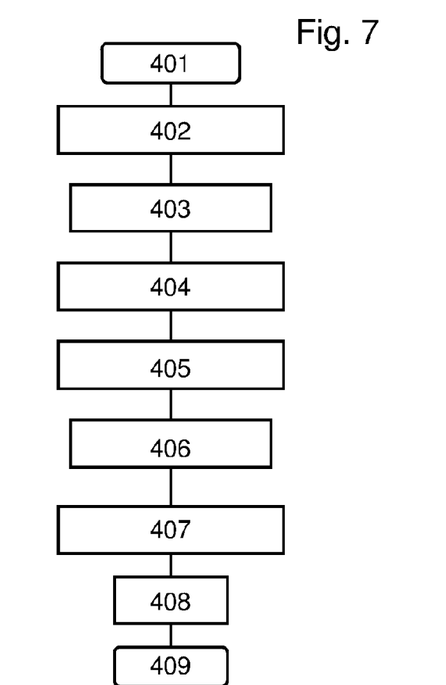
FIG. 7 illustrates a logic diagram of the execution of a load transfer command.

FIG. 7 is a logic diagram of the execution of a load transfer command by the control circuit 233. The execution of a transfer command can for example be carried out in the form of a task executed by the control module 23.

During a step 401, the control circuit 233 receives a load transfer command Cp(B$_i$, ph$_j$, ph$_k$). During step 402, the control circuit 233 starts the inverter 22. The control circuit 233 commands the synchronization of the output voltage of the inverter 22 with the phase ph$_j$. During step 403, the circuit 232 commands the connection of the phase ph$_j$ and of the output of the inverter to the load of the box Bi. During step 404, the circuit 232 commands the disconnection from the phase ph$_j$ of the load of the box Bi. During step 405, the circuit 233 commands the progressive synchronization of the output voltage of the inverter 22 with the phase ph$_k$. During step 406, the circuit 232 commands the connection of the phase ph$_k$ and of the output of the inverter to the load of the box Bi. During step 407, the circuit 232 commands the disconnection of the output voltage of the inverter 22 of the load of the box Bi. During step 408, the inverter 22 is deactivated. The execution of the load transfer command terminates in step 409.

Figure 8:
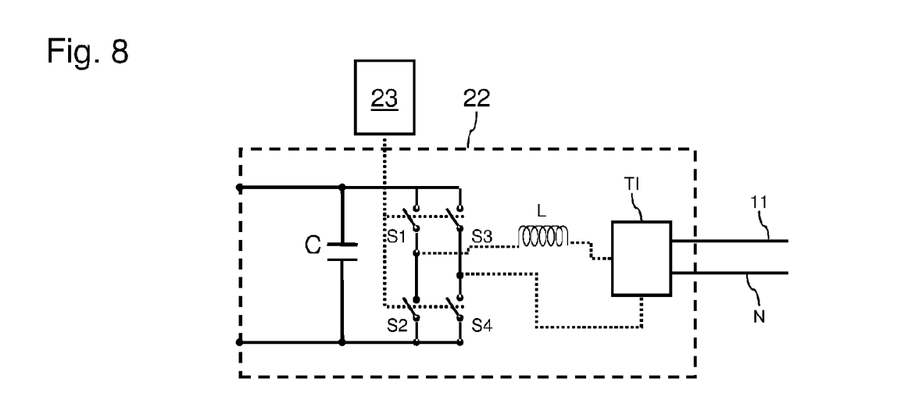
FIG. 8 is a simplified example of inverter structure of the balancing device.

FIG. 8 illustrates in a schematic manner a structure of an exemplary inverter 22 able to generate an output voltage allowing a load transfer. The inverter 22 is a pulse width modulation inverter, exhibiting for example a chopping frequency of 18 kHz. The inverter 22 receives a DC voltage on its input, this voltage being for example provided by the converter 21. The DC voltage is applied to the terminals of a capacitor C and to the terminals of a group of breakers S1 to S4 in a manner known per se. An intermediate node between the breakers S1 and S2 is connected to a first input terminal of an isolation transformer TI by way of an inductance L. An intermediate node between the breakers S3 and S4 is connected to a second input terminal and terminal of the isolation transformer TI. A first output of the isolation transformer TI is connected to the transfer line 11, a second output of the isolation transformer TI being connected to the neutral N of the network 3. The breakers S1 to S4 are controlled by the control module 23, and in particular by the circuit 233, so as to generate an alternating voltage whose phase is slaved.

The synchronization of the output of the inverter 22 with a phase or its progressive transfer to another phase can be carried out by the module 23 as follows. The use of a pulse width modulation inverter 22 with a chopping frequency of 18 kHz will be taken as assumption.

The values $n_i$ and $n_i$max are respectively defined by convention as the instantaneous phase and the period of a phase of index i. The values $n_i$ and $n_i$max are expressed in number of periods of a clock H1.

The pulse width control signal is generated by the output of a dual-ramp converter. A clock signal T0 is applied to a first input of the converter and a value Buffer0 is applied as reference to a second input of the converter. The pulse width control signal will be used to control the switching of respective transistors constituting the breakers S1 to S4.

A table stores digital values of the sine function over a period. This table stores for example 360 values Sine(n), with n an index lying between 0 and 359.

A clock signal H1 having a frequency of 4.5 kHz (four times lower than the frequency of H0) is moreover used. H1 triggers an interrupt program H1_IRQ.

The function of the interrupt program H1_IRQ is to increment the values of the variables $n_i$ and to update the value of Buffer0 so as to modify the duty ratio at the output of the dual-ramp converter. The table of values Sine(n) is used to recover the values of Buffer0 to be applied to the dual-ramp converter.

The module 23 comprises a device for detecting the zero-crossings upon a rising edge of each of the voltages of the phases ph1 to ph3. Each detection of a zero-crossing for a phase triggers an interrupt program IRQ2 for this phase. The execution of the program IRQ2 by a zero-crossing upon a rising edge of the phase i induces the copying of the value $n_i$ into $n_i$max and then the setting to zero of the value $n_i$. The value $n_i$max then corresponds to a measurement of the period of the phase i expressed in number of periods of the clock H1. For a frequency of the network 3 of 50 Hz, the order of magnitude of $n_i$max must be round about 90.

The values $n_i$ and $n_i$max therefore make it possible to have access instantaneously to the phase value of a phase i, expressed in radians by the following relation:

$$\Psi i = 2\pi * n_i / n_i \text{max}$$

To synchronize the output of the inverter 22 with the phase i, the value of Buffer0 in the program H1_IRQ is modified by recovering the value Sine(n) from the table, with $n = n_i * 360 / n_i \text{max}$ To take account of a variation of the amplitude on the network 3, a gain coefficient G is advantageously applied to the value Sine(n) to make it possible to adapt the output voltage of the inverter to the phase with which it must be synchronized.

During the synchronization of the output voltage of the inverter 22 with a phase i, the value Buffer0 is then defined by Buffer0=G*Sine($n_i$*360/$n_i$max)

During the transfer of the output voltage of the inverter 22 from a phase i to a phase j, the value Buffer0 used is then the following:

$$\text{Buffer0} = G * \text{Sine}((\text{offset} + n_i) * 360 / n_i \text{max})$$

With offset a value incremented (or decremented) by the execution of an interrupt program H2_IRQ, this interrupt program being for example executed at a frequency of 10 Hz. The value initially takes a zero value at the commencement of a phase transfer. It is considered that the transfer has terminated when the offset value reaches the value ($n_j - n_i$), thereby signifying that the output voltage of the inverter 22 is then synchronized with the phase j.

Thus, a load can be transferred progressively in a relatively reduced time from one phase to another without applying an abrupt phase change to it. With a frequency of incrementation of the offset value of 10 Hz, and by selectively using an incrementation or a decrementation as a function of the phase to which the transfer is performed, the duration of a load transfer can be reduced to about 3 seconds, with a frequency excursion on the line 11 limited to 0.11 Hz.

Figure 9:
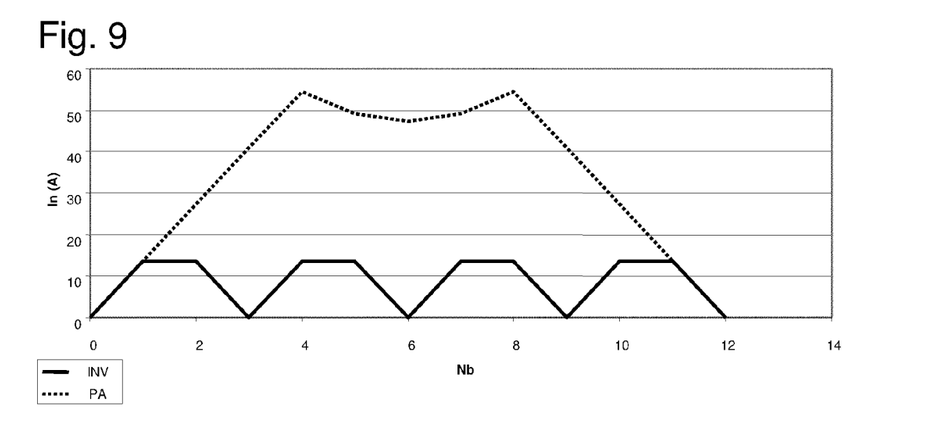
FIG. 9 illustrates the imbalances between phases conceivable in a particular case.

FIG. 9 is a comparative of the phase imbalances in a type of installation in which the invention can be implemented. The installation is a publicly accessible facility for recharging electric vehicles. In such an installation, publicly accessible parking places are furnished with stations for recharging the batteries of the vehicles. The recharging stations are connected to a three-phase electrical network. The vehicles connected to the recharging station constitute single-phase electrical loads.

FIG. 9 illustrates as ordinate the maximum neutral current on the three-phase network, representative of the imbalance of phases that may potentially be induced by the connections to the recharging station. The number of vehicles connected to the recharging station is illustrated as abscissa. It is assumed that each vehicle and its recharging station forms an equivalent electrical load of 3 kW.

According to the prior art, the recharging stations are connected in a definitive manner to respective phases of the three-phase network. Because the recharging facility is accessible to the public and the users can connect their vehicle to a recharging station of their choice, it is possible to find oneself in a situation in which only four vehicles are connected to recharging stations, these recharging stations being connected to one and the same phase of the three-phase network. The neutral current in the example then reaches about 52 A.

According to the invention, the recharging stations are connected dynamically to a respective phase so as to balance the loads on the three-phase network. A dynamic rebalancing such as this makes it possible to guarantee that the difference between the various numbers of vehicles connected to the phases of the three-phase network is a maximum of 1. The neutral current in the example then reaches at the maximum 13 A, whatever the number of connected vehicles.

The invention therefore turns out to be particularly advantageous for electrical installations in which the designer of the installation cannot envisage beforehand how the various single-phase loads will be connected, temporally and spatially.

The invention turns out to be particularly appropriate for a large number of different applications.

The invention turns out to be particularly appropriate for photovoltaic installations supplying three-phase networks. Such installations turn out to be particularly vulnerable to phase imbalances. On such installations, a phase imbalance can induce a heavy limitation of the loads that can be supplied or the necessity to extract current from an electrical network so as to inject current into one of the phases, thereby annihilating the beneficial effects of the photovoltaic installation. With the evolution of legislative frameworks, photovoltaic installations are increasingly earmarked for supplying a local polyphase network rather than reinjecting current into a public polyphase network. Local polyphase networks must thus exhibit greater autonomy relative to a public polyphase network.

The invention also turns out to be particularly appropriate for the management of an installation for recharging electric vehicles accessible to the public. Indeed, the distribution and the duration of recharging at each of the locations is extremely random, and this may lead to consequent phase imbalances. Each recharging installation would otherwise need to form the subject of a study as a function of the recharging habits specific to their location or to the public concerned.

The invention can also turn out to be advantageous for redefining the interconnection to the network of groups of residential dwellings. The invention can also be applied advantageously in office premises, in which the loads connected to the network may undergo large variations in the course of a day.

The invention also applies advantageously to pools of computer servers, in which the current inrushes may be significant and highly variable from one phase to another, and in which it turns out to be paramount to maintain service continuity while undertaking regular balancing.

Although the invention has been described in the particular example of a three-phase electrical network, it applies of course to any other type of polyphase electrical network.

The interconnection status of the boxes B1 to Bn can be stored subsequent to the commands emitted by the device 2, or can be advised by the microcontrollers M1 to Mn by way of the communication line 12.

The device 2 described comprises an AC/DC converter. An AC/DC converter independent of the device 2 can also be used. An external DC voltage source can also be used to supply the input of the inverter 22.

Figure 10:
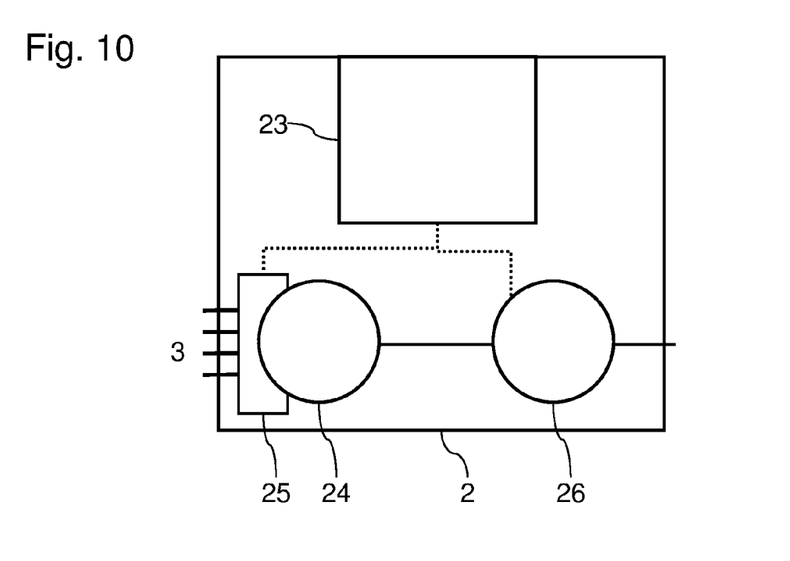
FIG. 10 is a schematic representation of a balancing device according to another embodiment of the invention.

FIG. 10 is a schematic representation of another embodiment of a phase balancing device 2 according to the invention. The AC/DC converter 21 and the inverter 22 are here replaced with an electric motor 24 furnished with a variable speed drive 25 and by a synchronous generator 26. The combination of the motor 24 and of the generator 26 forms a converter capable of modifying the phase shift between its output voltage and the voltage on the three-phase network.

The electric motor 24 is for example DC or AC but has a variable speed drive 25, thus making it possible to fix its rotation speed. The electric motor 24 is supplied by the three-phase electrical network. The electric motor 24 drives the rotor of the synchronous generator 26 in rotation. The generator 26 is for example of coiled rotor type.

The voltage generated across the terminals of the generator 26 consequently exhibits the frequency defined by the electric motor 24. The electric motor 24 and the generator 26 will be able to exhibit a nominal power comparable with that of the most significant load that it is desired to transfer between two phases.

The operation of the motor 24 and of the generator 26 is supervised by the control module 23. The control module 23 can implement a first regulating loop for the frequency and the phase of the output voltage of the generator 26, and a second regulating loop for the effective value of the output voltage of the generator 26.

The first regulating loop can alter the rotation speed of the rotor of the generator 26. The second regulating loop can alter the excitation current of the inductor of the generator 26.

To carry out for example the displacement of a single-phase load from the phase ph1 to the phase ph2, it is possible to proceed as follows:

the motor 24 is controlled and the inductor of the generator 26 is supplied so that its output voltage is in phase with the phase ph1 and exhibits the same amplitude;

the output of the generator is connected to the electrical load. The electrical load is then supplied both by the phase ph2 and by the output voltage of the generator 26.

the electrical load is disconnected from the phase ph1. The electrical load is supplied only by the output voltage of the generator 26.

the rotation speed of the motor 24 is slightly modified by way of the variable drive 25, the rotation speed of the rotor of the generator 26 being modified accordingly. The frequency of the output voltage of the generator 26 is modified accordingly. The rotation speed of the motor 24 remains modified until the output voltage of the generator 26 is synchronized with the phase ph2.

the phase ph2 is connected to the electrical load. The electrical load is then supplied by the generator 26 and by the phase ph2.

the output of the generator 26 is disconnected from the electrical load. The electrical load has indeed been transferred from the phase ph1 to the phase p2.

The invention claimed is:

1. An apparatus comprising a load-balancing device for load balancing on a polyphase electrical network, said load-balancing device comprising:

a voltage conversion device comprising a converter configured for generating a converter output voltage selectively connected to supply a single-phase electrical load to said polyphase electrical network, said converter being configured to selectively modify a phase shift between said converter output voltage and phases of said polyphase electrical network, a control module for controlling synchronization of said voltage conversion device, said control module being configured to control synchronization of said convener output voltage with a first phase of said polyphase electrical network, to control a progressive phase shifting of said converter output voltage until said converter output voltage is synchronized with a second phase of said polyphase electrical network, to control connection of said single-phase electrical load to said polyphase electrical network, to control connection of said electrical load to said converter output voltage when said converter is synchronized with said first phase of said polyphase electrical network, to maintain disconnection of said electrical load from said polyphase electrical network during said progressive phase shifting of said converter output voltage, and to control connection of said electrical load to said second phase of said polyphase electrical network when said converter output voltage is synchronized with said second phase of said polyphase electrical network.

2. The apparatus of claim 1, wherein said load-balancing device further comprises:

an interface for recovering consumptions of various single-phase loads connected to said polyphase electrical network, and a calculation module configured to determine an imbalance between phases on said polyphase electrical network, to identify a single-phase load for which a transfer to another phase would make it possible to improve said imbalance between phases, and to transmit, to said control module, a request for transfer to another phase for said identified load for controlling said synchronization of said convener.

3. The apparatus of claim 2, wherein said calculation module is further configured to identify several single-phase loads for which a transfer to other phases would make it possible to improve said imbalance between phases, and to transmit successive requests for transfer to other phases for said identified loads to said control module for controlling said synchronization of said converter.

4. The apparatus of claim 2, wherein said voltage conversion device further comprises an inverter.

5. The apparatus of claim 4, wherein said converter comprises an AC/DC converter comprising an interface for power supply by said polyphase network, wherein said converter supplies power to said inverter.

6. The apparatus of claim 4, wherein said control module controls progressive phase shilling of an output voltage of said inverter by modifying a frequency of said output voltage of said inverter.

7. The apparatus of claim 1, further comprising an electric motor comprising a variable speed drive supplied by said polyphase electrical network, and a synchronous generator driven by said electric motor and generating said converter output voltage.

8. The apparatus of claim 1, further comprising an interconnection device for interconnecting an electrical load to said electrical network, and a switching device in communication with said control module, wherein said interconnection device comprises a first interface, a second interface and a third interface, wherein said first interface connects to said phases of said polyphase electrical network, wherein said second interface connects to said electrical load, wherein said third interface connects to a power supply line on which said output voltage of said converter is applied, and wherein said switching device is configured for selectively connecting to one of said second interface and said third interface in response to signals received from said control module.

9. The apparatus of claim 8, wherein said interconnection device comprises a measurement device for measuring electrical consumption of an electrical load connected to said second interface, said measurement device being in communication with said load-balancing device.

10. The apparatus of claim 1, further comprising transport lines for respective phases of said polyphase electrical network, a photovoltaic generator supplying said phases to said transport lines, wherein said load-balancing device for load balancing is connected to said transport lines and to said photovoltaic generator.

11. A method of load balancing on a polyphase electrical network, said method comprising:

synchronizing an output voltage of an inverter with a first phase of an electrical network supplying a single-phase load, applying said output voltage of said inverter to a transfer line, connecting said load to said transfer line and disconnecting said load from said first phase;

progressively phase shifting said output voltage of said inverter until said output voltage is synchronized with a second phase, and connecting said load to said second phase.

12. The load-balancing method as claimed in claim 11, further comprising: prior to synchronizing said output voltage, recovering electrical consumptions of said various loads connected to said electrical network, determining of an imbalance between phases on said network, and based on said recovered electrical consumptions, identifying a load for which a change of phase would make it possible to improve said imbalance between phases.

* * * * *